United States Patent Office 3,479,310
Patented Nov. 18, 1969

3,479,310
POLYURETHANE PLASTICS
Dieter Dieterich and Otto Bayer, Leverkusen, Germany, assignors to Farbenfabriken Bayer Aktiengesellschaft, Leverkusen, Germany, a German corporation
No Drawing. Filed Sept. 15, 1964, Ser. No. 396,701
Claims priority, application Germany, Sept. 19, 1963, F 40,799
Int. Cl. C08g 41/00, 51/24
U.S. Cl. 260—29.2                                   7 Claims

ABSTRACT OF THE DISCLOSURE

A polyurethane ester is prepared by dispersing in water a polyurethane containing from about 0.02 to about 1% by weight salt groups. The polyurethane can be dispersed without the aid of additional emulsifying agent.

---

This invention relates to polyurethanes and more particularly to dispersions of high molecular weight polyurethanes in water as well as polyurethane latex.

It has been proposed heretofore, for example, in U.S. Patent 2,968,575 to prepare a polyurethane latex where the isocyanate and the active hydrogen containing component are reacted together in water or dispersed in water after reaction with the aid of an emulsifier. The use of emulsifiers is objectionable in some cases because the dispersions are hydrophilic and thus not suitable for some purposes, for example, for use as waterproof coatings. Furthermore, the production of other hydrophilic films foils, threads and the like is not entirely satisfactory due to the presence in the polyurethane of the emulsifying agent which is necessary in order to produce a stable dispersion.

It has also been proposed heretofore to include quaternizable components in the reactants leading to the production of the polyurethane plastics and to cross-link the product through the quaternary groups. Still further, for example in German Patent 880,485, a process is proposed which uses sufficient amounts of a quaternized component to make the polyurethane plastic water soluble. The use of large amounts of the quaternary agents, however, will not produce a latex because the polyurethanes are completely solubilized and not dispersed to make the desired latex, free from hydrophilic characteristics, so that they are suitable for waterproof coatings, threads, films and the like.

It is therefore an object of this invention to provide an improved polyurethane dispersion in water which is free from an emulsifier. Another object of this invention is to provide an improved polyurethane latex which is suitable for the preparation of waterproof coatings. Still another object of this invention is to provide an improved polyurethane latex and an improved method of making the same which avoids the use of emulsifying agents or other additives which later interfere with the use of the polyurethane latex. A further object of this invention is to provide an improved method of dispersing polyurethane in water, and an improved dispersion obtained thereby.

The foregoing objects and others which will become apparent from the following description are accomplished in accordance with the invention, generally speaking, by providing polyurethane dispersions which contain from about 0.02 to about 1% of salt type groups except that where the salt type groups are a quaternary nitrogen atom they account for not more than about 0.2% by weight of the total weight of the polyurethane. Thus, this invention provides for the preparation of water dispersions of polyurethanes wherein compounds with acid groups which can be neutralized by base are incorporated into the polyurethane components in either monofunctional or polyfunctional form and then the acid groups are converted to the salt to produce a dispersible composition. However, in order to avoid the complete solution of the polyurethane and simultaneously avoid the preparation of a solution of the polyurethane, a critical amount of the salt type groups is present in the polymer between about 0.02 and about 1% by weight with the provision that quaternary nitrogen atoms account for no more than 0.2% by weight of the polyurethane polymer. It is not necessary to incorporate the salt forming components into the polyurethane in bifunctional or polyfunctional form as is customary in the process of building up polyurethane prepolymers. It is satisfactory to incorporate monofunctional compounds such as halogen alcohols, tertiary amino alcohols or amino acids. The salt type group is preferably chemically bonded into the polyurethane.

Any suitable process of preparing the polyurethane latices may be used including, for example, the preparation of both anionic and cationic latices. The resulting polyurethane plastics obtainable from these latices are free from emulsifiers and are predominantly hydrophobic in character and free from hydrophilic low molecular weight impurities. The polyurethanes are preferably predominantly linear and are produced from polyhydroxyl compounds which have a molecular weight preferably of from about 300 to about 10,000, organic polyisocyanates and, if desired, chain lengthening agents. In the production of the polyurethane dispersions, a component having at least one salt type group is included. This may be a compound with active hydrogen atoms as determined by the Zerewitinoff method and thus capable of reacting with an isocyanato group or it can be an isocyanate. It is also possible to use some of each so long as the final product for dispersion or the final product in the dispersion has from about 0.02 to about 1% by weight of the salt type groups and no more than 0.2% of the polyurethane plastic is quaternary nitrogen atoms. If the organic compound has at least two active hydrogen containing groups and contains the salt type group or group capable of salt formation, or if the isocyanate contains a plurality of isocyanate groups, these compounds may be the sole compounds used to prepare the polyurethane polymer. The chain lengthening agents may have the salt type group. After the prepolymer is formed, which has the group capable of forming a salt, the reaction mixture is converted into an aqueous latex by reaction of the salt type groups with a base or alternatively with an acid depending on the ion used and dispersed in water. It is sometimes desirable to prepare the initial polymer in an inert organic solvent and subsequently convert the polymer into an aqueous latex, for example, by the known methods for vinyl polymers.

Any suitable organic compound containing active hydrogen containing groups as determined by the Zerewitinoff method may be used. It is preferred to use organic polyhydroxyl compounds which are predominantly linear and have a molecular weight of from about 300 to about 10,000, preferably from about 500 to about 4000. The most suitable polyhydroxyl compounds include polyalkylene ether glycols, dihydroxyl polyesters, including dihydroxy polyesteramides, dihydroxy polyacetals and dihydroxy polythioethers.

Any suitable polyalkylene ether glycol may be used including those prepared from tetrahydrofuran, propylene oxide, co-polymerization products or graft polymerization products of these compounds such as the products of the addition of the aforementioned polyalkylene oxides and polystyrene and the like. It is also possible to use mixed polyethers obtained, for example, by the condensation of 1,6-hexane diol, 3-methyl-1,6-hexane diol, 1,7-heptane diol, 1,8-octane diol or the like with or without the addition of 10 to 30% of lower glycols such as, for example, ethylene glycol, 1,2-propane diol and the like. In addition, one may use propoxylated and ethoxylated or mixed propoxylated and ethoxylated glycols such as, propoxylated butane diol or ethoxylated amines such as propoxylated N,N'-dimethyl diethylene diamine and the like.

Any suitable polyhydric polythioether may be used, such as, for example, the condensation product of thiodiglycol with itself or with other glycols such as ethylene glycol, 1,2-propylene glycol and the like as well as those which contain tertiary nitrogen atoms, for example, N,N-dihydroxy p-ethyl-aniline and the like.

Any suitable polyacetal may be used, but it is preferred to use the water soluble types, for example, those from 1,6-hexanes diol and formaldehyde, from 4,4'-dihydroxy-ethoxy-diphenyl-dimethyl-methane and formaldehyde and the like.

Any suitable polyester may be used such as, for example, those obtained from polyhydric alcohols and polycarboxylic acids to which diamines and amino alcohols may be added to prepare polyesteramides. Any suitable polyhydric alcohol, but preferably a dihydroxy alcohol such as, for example, diethylene glycol, 1,2-propane diol, 1,4-butane diol, 1,6-hexane diol and the like together with minor amounts of trimethylolpropane, glycerine or the like may be used. Any suitable polycarboxylic acid may be used such as, for example, adipic acid, phthalic acid, terephthalic acid, sebacic acid, suberic acid, azelaic acid or the like together with minor amounts of tricarboxylic acids such as, for example, 1,3,5-benzene tricarboxylic acid and the like. Any suitable diamine such as ethylene diamine or amino alcohol such as ethanol amine may be used.

It is also possible to use polyhydroxyl compounds which contain urethane or urea groups as well as mixtures of the various polyhydroxy compounds including hydrophilic polyethers, such as polyethylene glycol, polyesters and polyacetals. It is preferred to use predominantly hydrophobic polyhydroxyl compounds and hydrophilic polyhydroxyl compounds should only be used in certain proportions which will not harm the final product. In general, less than about 25% of the polyhydroxyl compound should be of the hydrophilic type. It is also possible to use natural polyols such as castor oil, hydroxylated tall oil, carbohydrates and the like.

The salt type or salt forming group may be in the organic polyisocyanate or polyhydroxyl compound and components suitable for the preparation of salt containing polyisocyanates and polyhydroxyl compounds are disclosed below.

Any suitable organic polyisocyanate may be used, but it is preferred to use organic diisocyanates and especially aliphatic and aromatic diisocyanates such as, for example 1,5-naphthylene diisocyanate, 4,4'-diphenylmethane diisocyanate, 4,4'-diphenyl-dimethylmethane-diisocyanate, di- and tetralkyl-diphenyl-methane diisocyanate, 4,4'-dibenzyl diisocyanate, 1,3-phenylene diisocyanate, 1,4-phenylene diisocyanate, toluylene diisocyanate, chlorinated and brominated isocyanates, isocyanates containing phosphorous, butane-1,4-diisocyanate, hexane-1,6-diisocyanate, dicyclohexylmethane diisocyanate, and cyclohexane-1,4-diisocyanate. Isocyanates which deserve to be specially mentioned are partially masked isocyanates which enable the formation of self-cross linking polyurethanes, e.g. dimeric toluylene diisocyanate as well as polyisocyanates which have been partially or completely reacted e.g. with phenol, tertiary butanol, phthalimide or caprolactam and which, when they are completely masked, at first do not take part in the reaction but are simply mixed into the reaction mixture.

Chain lengthening agents with reactive hydrogen atoms which could also be used would be, for example, the usual glycols such ethylene glycol, di-, tri- and tetraethylene glycol, 1,4-butane diol, propane diol-1,2, propanediol-1,3, neopentylglycol, dihydroxyethoxyhydroquinone, dihydroxyethyldiane, and also diamines, e.g. ethylene diamine, hexamethylenediamine, hydrazine, ammonia, benzidine, diaminodiphenylmethane, aminoalcohols such as ethanol amine and water.

As compounds which contain at least one hydrogen atom reactive with isocyanate groups or at least one isocyanate group and at least one group capable of salt formation there may be used alone or in admixture the following compounds:

(1) Compounds which have basic tertiary amino groups which can be neutralized or quaternized with aqueous acids:

(a) Alcohols, especially alkoxylated aliphatic, cycloaliphatic, aromatic and heterocyclic, secondary amines e.g. N,N-dimethylethanolamine, N,N-diethylethanolamine, N,N-dibutylethanolamine, 1-dimethylaminopropanol-2, N,N-methyl-beta-hydroxyethyl-aniline, N,N-methyl-beta-hydroxy-propyl-aniline, N,N-ethyl-beta-hydroxyethyl-aniline, N,N-butyl-beta-hydroxyethylaniline, N-oxoethylpiperidine, N-oxoethylmorpholine, alpha-hydroxyethylpyridine and alpha-hydroxy-ethyl-quinoline.

(b) Diols and triols especially alkoxylated aliphatic, cycloaliphatic, aromatic and heterocyclic primary amines, e.g. N-methyl-diethanolamine, N-butyldiethanolamine, N-oleyl-diethanolamine, N-cyclohexyl-diethanolamine, N-methyl-diisopropanolamine, N-cyclohexyl-diisopropanolamine, N,N-dioxaethylaniline, N,N-dioxaethyl-m-toluidine, N,N-dioxaethyl-p-toluidine, N,N-dioxypropyl-naphthylamine, N,N-tetraoxaethyl-alpha-amino-pyridine, dioxaethylpiperazine, polyethoxylated butyldiethanolamine, polypropoxylated methyldiethanolamine (molecular weight 1000), polypropoxylated methyl diethanolamine (molecular weight 2000), polyesters with tertiary amino groups, tri-[2-hydroxypropyl-(1)]-amine, N,N-di-n-(2,3-dihydroxypropyl)-aniline, N,N'-dimethyl-N,N'-bis-oxaethylhydrazine and N,N'-dimethyl-N,N'-bis-oxypropyl-ethylenediamine.

(c) Aminoalcohols, e.g. addition products obtained by hydrogenation, of alkylene oxide and acrylonitrile to primary amines, e.g. N-methyl-N-(3-aminopropyl)-ethanolamine, N-cyclohexyl-N-(3-aminopropyl)-propanol-2-amine, N,N-bis-(3-aminopropyl)-ethanolamine, and N-3-aminopropyldiethanolamine.

(d) Amines, e.g. N,N-dimethylhydrazine, N,N-dimethyl-ethylenediamine, 1-di-ethylamino-4-aminopentane, alpha-aminopyridine, 3-amino-N-ethylcarbazole, N,N-dimethyl-propylene-diamine, N-aminopropyl-piperidine, N-aminopropyl-morpholine, N-aminopropyl-ethyleneimine and 1,3-bis-piperidine-2-amino-propane.

(e) Diamines, triamines, amides especially compounds obtained by hydrogenation of addition products of acrylonitrile to primary and disecondary amines e.g. bis-(3-aminopropyl)-methylamine, bis-(3-aminopropyl)-cyclohexylamine, bis-(3-aminopropyl)-aniline, bis-(3-aminopropyl)-toluidine, diaminocarbazole, bis-(aminopropoxyethyl)-butylamine, triaminopropyl)-amine, N,N-bis-carbonamidopropyl-hexamethylene-diamine, and products obtained by the addition of acrylamide to diamines and diols.

(2) Compounds which contain halogen atoms capable of quaternating reactions or suitable esters of strong acids: 2-chloroethanol, 2-bromoethanol, 4-chlorobutanol, 3-bromopropanol, beta-chloroethylamine, 6-chlorohexylamine, ethanolamine-sulphuric acid ester, N,N-bis-hydroxy-ethyl-N'-N-chloromethylphenyl-urea, N-hydroxy-N'-chlorohexyl urea, glycerolamino-chloroethyl-urethane, chloro-acetyl-ethylenediamine, bromoacetyl-dipropylenetriamine, trichloroacetyl-triethylenetetramine, glycerol-alpha-bromhydrin, polypropoxylated glycerol-alpha-chlorohydrin, polyester with aliphatically bound halogen and 1,3-dichloropropanol-2.

The following are examples of suitable isocyanates: chlorohexylisocyanate, m-chloromethylphenyl-isocyanate, p-chlorophenyl - isocyanate, bis - chloromethyl-diphenyl-methane diisocyanate, 2,4-diisocyanate-benzyl chloride, 2,6-diisocyanate benzyl chloride and N-(4-methyl-3-isocyanate-phenyl)-beta-bromoethyl-urethane.

(3) Compounds which contain carboxylic acid groups or hydroxyl groups capable of salt formation:

(a) Hydroxy and mercapto carboxylic acids: glycollic acid, thioglycollic acid, lactic acid, trichloro-lactic acid, malic acid, dihydroxymaleic acid, dihydroxy-fumaric acid, tartaric acid, dihydroxy-tartaric acid, mucic acid, saccharic acid, citric acid, glycerol boric acid, pentaerythritol boric acid, mannitoboric acid, salicyclic acid, 2,6-dihydroxy-benzoic acid, protocatechuic acid, beta-resorcylic acid, alpha-resorcylic acid, hydroquinone-2,5-dicarboxylic acid, 4-hydroxy-isophthalic acid, 4,6-dihydroxy-isophthalic acid, oxyterephthalic acid, 5,6,7,8-tetrahydro-naphthol-2-carboxylic acid-3, 1-hydroxynaphthoic acid-2, 2,8-dihydroxynaphthoic acid-3, beta-oxypropionic acid, m-oxybenzoic acid, pyrazolone-carboxylic acid, uric acid, barbituric acid, resoles and other phenol-formaldehyde condensation products.

(b) Polycarboxylic acids: sulphone diacetic acid, nitrilo-triacetic acid, ethylene diamine-tetracetic acid, diglycollic acid, thiodiglycollic acid, methylene-dithioglycollic acid, malonic acid, oxalic acid, succinic acid, glutaric acid, adipic acid, maleic acid, fumaric acid, gallic acid, phthalic acid, tetrachlorophthalic acid, isophthalic acid, terephthalic acid, naphthalinic tetracarboxylic acid-(1,4,5,8), o-tolylimido-diacetic acid, beta-naphthylimido-diacetic acid, pyridine-dicarboxylic acid and dithiodipropionic acid.

(c) Aminocarboxylic acids: oxaluric acid, anilido acetic acid, 2-hydroxy-carbazole-carboxylic acid-3, glycine, sarcosine, methionine, alpha-alanine, beta-alanine, 6-aminocaproic acid, 6-benzoyl-amino-2-chlorocaproic acid, 4-aminobutyric acid, aspartic acid, glutamic acid, histidine, anthranilic acid, 2-ethylamino - benzoic acid, N - (2-carboxyphenyl)-aminoacetic acid, 2-(3'-amino-benzenesulphonyl-amino)-benzoic acid, 3-aminobenzoic acid, 4-aminobenzoic acid, N-phenylaminoacetic acid, 3,4-diaminobenzoic acid, 5-aminobenzene-dicarboxylic acid and 5-(4'-aminobenzoyl-amino)-2-aminobenzoic acid.

(d) Hydroxy- and carboxy-sulphonic acids: 2-hydroxyethanesulphonic acid, phenolsulphonic acid-2, phenolsulphonic acid-3, phenolsulphonic acid-4, phenol-disulphonic acid-2,4, sulphoacetic acid, m-sulpho-benzoic acid, p-sulphobenzoic acid, benzoic acid-1-disulphonic acid-3,5, 2-chlorobenzoic acid-1-sulphonic acid-4, 2-hydroxybenzoic acid-1-sulphonic acid-5, naphthol-1-sulphonic acid, naphthol-1-disulphonic acid, 8-chloronaphthol-1-disulphonic acid, naphthol-1-trisulphonic acid, naphthol-2-sulphonic acid-1, naphthol-2-trisulphonic acid, 1,7-dihydroxy-naphthalenesulphonic acid-3, 1,8-dihydroxynaphthalene-disulphonic acid-2,4, chromotropic acid, 2-hydroxynapthoic acid-3-sulphonic acid-6, and 2-hydroxycarbazole-sulphonic acid-7.

(e) Aminosulphonic acids: aminosulphonic acids, hydroxylamine-monosulphonic acid, hydrazine-disulphonic acid, sulphanilic acid, N-phenyl-aminomethane-sulphonic acid, 4,6-dichloroaniline-sulphonic acid-2, phenylenediamine-1,3-disulphonic acid-4,6, N-acetylnaphthylamine-1-sulphonic acid-3, naphthylamine-1-sulphonic acid, naphthylamine-2-sulphonic acid, naphthylamine-disulphonic acid, naphthylamine-trisulphonic acid, 4,4'-di-(p-amino-benzoyl-amino)-diphenyl urea-disulphonic acid-3,3', phenylhydrazine - disulphonic acid-2,5, 2,3 - dimethyl - 4-aminoazobenzene-disulphonic acid-4',5, 4'-amino-stilbene - disulphonic acid - 2,2'-<4-azo-4>-anisole, carbazole-disulphonic acid-2,7, taurine, methyl-taurine, butyltaurine, 3-amino-benzoic acid-1-sulphonic acid-5, 3-amino-toluene-N-methane-sulphonic acid, 6-nitro-1,3-dimethylbenzene-4-sulphaminic acid, 4,6 - diaminobenzene - disulphonic acid-1,3, 2,4-diamino - toluene - sulphonic acid-5, 4,4'-diamino-diphenyl - disulphonic acid - 2,2', 2-aminophenol-sulphonic acid-4, 4,4'-diamino-diphenylether-sulphonic acid - 2, 2 - amino-anisole-N-methanesulphonic acid and 2-amino-diphenylamine-sulphonic acid.

Inorganic and organic acids and compounds having reactive halogen atoms and corresponding esters of strong acids may be used as the salt-forming substances for Group 1.

The following are a few examples: hydrochloric acid, nitric acid, hypophosphoric acid, amidosulphonic acid, hydroxylamine-monosulphonic acid, fumaric acid, acetic acid, glycollic acid, lactic acid, chloroacetic acid, bromoacetic acetate, sorbitol-boric acid, methyl chloride, butyl bromide, dimethylsulphate, diethylsulphate, benzyl chloride, p-toluene-sulphonic acid methyl ester, methyl bromide, ethylene chlorohydrin, ethylene bromohydrin, glycerol-alpha-bromohydrin, chloroacetic ester, chloroacetamide, bromoacetamide, dibromoethane, chlorobromobutane, dibromobutane, ethylene oxide, propylene oxide and 2,3-epoxypropanol.

The compounds of Group 2 may be quaternated or ternated with tertiary amines and also with sulphides or phosphines. Quaternary ammonium- and phosphonium- or ternary sulphonium salts are then formed.

The following are examples: trimethylamine, triethylamine, tributylamine, pyridine, triethanolamine, the compounds given under Groups 1a and 1b, dimethylsulphide, diethylsulphide, thiodiglycol, thiodiglycollic acid, trialkylphosphines, alkylarylphosphines and triarylphosphines.

Suitable salt-forming agents for the compounds of Group 3 are inorganic and organic bases, e.g. sodium hydroxide, potassium hydroxide, potassium carbonate, sodium hydrogen carbonate, ammonia, primary, secondary and tertiary amines. Finally, inorganic phosphorous compounds may also be used as compounds capable of salt formation, and these include both basic phosphines which are capable of being incorporated in the molecule, such as diethyl-beta-hydroxyethylphosphine, methyl-bis-beta-hydroxyethylphosphine, tri-beta-hydroxymethylphosphine, and derivatives such as phosphinic acids, phosphonous acids, phosphonic acids, and esters of the phosphorous, phosphoric acids, and their thioanalogues, e.g. bis - (alpha-hydroxy-isopropyl)-phosphinic acid, hydroxy-alkane-phosphoric acid, phosphoric acid-bis-glycollic ester.

The salt-forming components can be added in the course of the production of the polyurethane at any suitable time either with or without the presence of solvents, and the salt formation taking place either during the formation of the basic polyurethane polymer or at the time of the dispersion. Where the salt-forming components are polyfunctional they may either partly or entirely replace the other polyhydroxyl compounds set forth above or the polyisocyanate or the chain lengthening agents provided that the critical amount of salt type component is present in the compound. The ratio of the total of —NCO groups to the total of reactive hydrogen atoms is determined by the type of product desired. If the initial product is to be soluble in organic solvents, the molar ratio of —NCO groups to active hydrogen atoms is preferably between about 0.4:1 and about 1.5:1 most preferably 0.9:1 to 1.2:1. The preadduct is generally formed first from the high molecular weight polyhydroxyl compound either as a melt or as a solution by reaction of the polyhydroxyl compound with an organic polyisocyanate. This preadduct is then reacted with a chain lengthening agent in solution, if desired. In principle, this method could also be used in cases where the salt component or the component capable of salt formation is only monofunctional and therefore does not react like a chain lengthening agent. Where all monofunctional salt forming components are used it is frequently advantageous to add a trifunctional component or higher functional component including trimethylolpropane, a diamine such as ethylene diamine, an organic polyisocyanate, such as triphenylmethane triisocyanate, or even water in order to compensate for the interruption of the chains by the monofunctional component.

On the other hand, it may be advisable to incorporate the salt-forming component into the preadduct. This is especially true for salt-forming components which are in themselves monofunctional such as salts of hydroxy- or amino-carboxylic acids or sulphonic acids and especially where the polyhydroxy compound contains the salt-forming components.

It is possible to add the component capable of forming a salt together with a component which produces the salt, thus producing the salt in situ.

After the formation of the preadduct, an organic solvent is preferably added and the reaction is preferably continued at a relatively low temperature of about 20 to about 100° C., especially where very reactive chain lengthening agents are used. Thus, the polyurethane preadduct remains of a low viscosity so that it can be easily stirred into the aqueous phase. It is preferred that the solvents be of essentially nonflammable character and at most they contain no more than 20% by weight of the polyurethane of a solvent which is hydrophobic or inflammable. The choice of solvents is important for the production of the aqueous latex dispersion in a later stage. It is preferable for the polyurethane latex to be completely free from solvent, so that the solvent added in the course of the process in order to make the preadduct easier to work up should be one which is easily removed from the water containing phase by distillation. Therefore, the preferred solvents are benzene, ethyl acetate, acetone, methyl ethyl ketone and the like. Other solvents may be used, but should not have a boiling point above that of water and should be inert to isocyanates provided that the solvent is to be added during the course of the reaction while free isocyanato groups are present. If it is desired to dilute the reaction mass after the reaction is completed, lower alcohols such as methanol can be used.

It is not always necessary to use a solvent and the whole reaction can be carried out in the melt without any solvent to obtain a rubbery mass which is subsequently dissolved in a polar or non-polar and/or water containing solvent. The solubility of the polyurethane in an aqueous organic medium or the solubility of the water in the polyurethane which contains solvent depends mainly on whether the mass contains too many or too few salt type groups in accordance with the invention.

If the polyurethane mass is not formed as a salt, the high molecular weight polyurethane formed is subsequently, if desired in solution converted into a salt by adding the quaternating or neutralizing agent, if necessary leaving it to react for some time at elevated temperature. Although the neutralization generally takes place sufficiently rapidly even at room temperature, it is sometimes desirable to heat for about 10 to about 180 minutes at about 50 to about 120° C. for carrying out the quaternating reaction. The quantity of quaternating or neutralization agent depends on the quantity of salt forming groups present in the polyurethane mass. An excess may be useful only in the case of volatile compounds which are easily removed (acetic acid, methyl chloride, ammonia). It is frequently useful to have slightly less than an equivalent quantity of quaternating or neutralizing agent, in order to ensure a favorable pH of the reaction medium. However, it is also possible to convert only a fraction of the groups capable of salt formation in the polyurethane mass into the form of a salt. Bifunctional quaternating agents such as dibromobutane are preferably used in excess in order to suppress bilateral reaction which would lead to chain lengthening or cross-linking.

The proportion of salt type groups must be 0.02 to 1% but in the case of quaternary nitrogen atoms not more than 0.2% of the polyurethane mass, where "salt type group" are understood to mean, for example, the following groups:

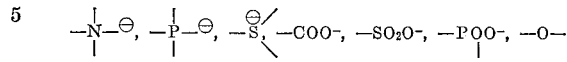

The polyurethane mass converted into the form of a salt now has unlimited compatibility with water and can be converted into an aqueous latex by the methods usually employed in the chemistry of elastic and plastic polymers. A preferred method consists in diluting the polyurethane mass, which carries salt-type groups and is dissolved in a polar solvent, with about 70 to about 150% of its weight of water, and then largely or completely distilling off the organic solvent under reduced pressure. On dilution with water, a homogeneous molecular disperse solution is first formed, which on further addition of water becomes opaque and is converted into a colloidal disperse solution. In the course of the removal of organic solvent, the particle size continues to increase so that finally a coarsely dispersed stable latex is formed which generally has a solids content of about 30 to 70% by weight.

It is possible to use other methods for taking the polyurethane mass into the aqueous phase, e.g., the organic polyurethane solution may be run into the given quantity of water while stirring vigorously, and the organic solvent may be removed at the same time or afterwards. Nonpolar solvents may be used in both methods, an emulsion being formed in the presence of water.

It is also possible to inject the still liquid polyurethane mass free from solvent into water, e.g. by means of nozzles, with or without the use of compressed air, particles of the size of latex particles being then formed immediately. Ultrasonic waves may also be used for forming the dispersion.

However, it must be emphasized that such energy consuming arrangements are not necessary and that the latices may be produced in a simple manner as described above.

The latices are in any case stable without the addition of an emulsifier. However, for certain purposes, where the latices would be subjected to particularly high mechanical or chemical stresses such as in electrolytes, small quantities of stabilizers may be added to the finished latex. When a stabilizer is used, the electric charge of the polyurethane must be taken into account. It is preferred to use neutral stabilizers, e.g. oleyl alcohol polyglycol ethers or oxyethylated phenols.

It is, of course, also possible to use protective colloids, for example, casein which has been opened up by ammonia may be used for anionic latices and casein which has been opened by acetic acid or lactic acid may be used for cationic latices, gelatine, gum arabic, tragacanth, modified starch, fish glue, agar, colophony or polyvinyl alcohol, to increase as far as possible the mechanical and chemical stability of the latices.

The latices may be mixed with polymer latices having the same charge e.g. with polyvinyl chloride-, polyethylene-, polystyrene-, polybutadiene- and copolymer latices. Since these are mostly anionic, the carboxylic acid and sulphonic acid salts of polyurethanes would mainly be used for such mixtures.

It is also possible to incorporate into the latices fillers and plasticizers, e.g. sols of carbon black and silicic acid and disperions of aluminium hydroxide, clay and asbestos. The incorporation of plasticizers such as phthalates or hydrophobic oils generally does not give rise to any difficulties since they will dissolve in the hydrophobic part of the polyurethane particles. The incorporation of pigments is also possible.

Finally, cross-linking agents may be added to the latices, these agents bringing about chemical cross-linking after evaporation of the water at room temperature or elevated temperature.

Examples are sulphur sol, formaldehyde and substances which give off formaldehyde or react like formaldehyde, and masked isocyanates and peroxides. Water-soluble cross-linking agents such as formaldehyde, methylol compounds and their ethers are simply added to the finished latex, whereas hydrophobic, masked isocyanates are preferably dissolved in a non-polar solvent which is immiscible with water and emulsified in the form of this solution into the latex without additional emulsifier. The hydrophobic latex particles then take up the hydrophobic solvent together with the cross-linking agent and swell up.

The possibility of using polyurethanes of very many different compositions in the aqueous phase opens up many new possibilities of use for this group of high molecular weight polymers. Thus, for example, dipped goods may be produced, and also foam plastics, e.g. by the latex foam beating process. The soft to crumbly coagulates obtained by the addition of electrolyte facilitate further processing on rubber mixing rollers or internal mixers, using the auxiliary substances and processing techniques normally used in the rubber industry. The absence of emulsifiers also makes it possible to use the products for a number of purposes for which latices containing emulsifiers are less suitable, such as for coating woven and non-woven textiles, leather, paper, wood, metal, impregnating fibers and textiles e.g. to produce antistatic and crease-resistant finishes, as binders for fleeces, adhesives, adhesifying agents, backings, agents for rendering substances hydrophobic, as elasticizing and abrasion resistant components in the building industry, e.g. in concrete mixtures and asphalt mixtures, for outdoor coatings, as versatile binding agents, e.g. for powdered cork or sawdust, glass fibers, asbestos, materials containing paper, plastic or rubber waste, ceramic materials. Further, the products of the process are suitable for the production of elastic films, foils and threads, as plasticizers or as auxiliary agents in cloth printing and in the paper industry, as additives to synthetic resin dispersions, as sizing agents and as leather dressings.

The invention is further illustrated by the following examples in which parts are by weight unless otherwise specified.

Example 1

About 1 kg. adipic acid-hexanediol-neopentyl glycol-polyester (OH number about 61) is dried in vacuo at about 120 to about 130° C. and then treated with about 268 g. of 1,6-hexane-diisocyanate. The melt is kept for about 2 hours at about 120° C. with stirring, and a solution of about 20 g. N-methyldiethanolamine in about 800 ml. acetone, which has a water content of about 0.2% is then added at about 40° C. At the end of about 3 hours stirring at about 50° C., the solution has become viscous and is diluted with about 1.2 liters acetone.

About 575 g. of the 43% solution are treated with about 3.0 cc. dimethylsulphate and the solution is heated for ½ hour at about 50° C. About 300 ml. water are then added and the acetone is distilled off in a water bath at about 50° C. under reduced pressure. A pure aqueous 50% viscous polyurethane latex remains behind which does not change as to viscosity and appearance after storage for eight months and which leaves elastic non-adhesive films of high tensile strength on glass plates.

Example 2

The process is carried out as in Example 1 but using about 149 g. hexane-diisocyanate and about 8 g. N-methyl-diethanolamine.

About 684 g. of the 42.4% solution of polyurethane in acetone are quaternated with about 1.5 cc. dimethylsulphate at about 50° C., and about 300 cc. water are added dropwise with stirring. The acetone present is then removed in vacuo. A 56%, very thinly liquid, stable polyurethane latex is obtained which, after the addition of 1% casein lactate, the amount being calculated on polyurethane, can be further concentrated. The fibrous coagulate obtained after the addition of common salt solution can easily be worked up on rubber mixing rollers after drying.

Example 3

About 1 kg. polypropylene glycol (molecular weight about 2000) are dried in vacuo at about 120 to about 130° C. and treated wtih about 174 g. 4,4'-diphenylmethane diisocyanate. The mixture is kept at about 130° C. for about 10 minutes and then cooled to about 55° C. At this temperature, about 20 g. N-methyldiethanolamine are stirred into the mixture, and the melt which rapidly becomes viscous, is then heated for another about 24 hours at about 100° C. A rubbery mass results which has a Defo hardness of about 1500 to about 20° C. and a Defo elasticity of about 31.

About 888 g. of a 24% solution of polyurethane in acetone are treated with about 100 ml. 80% acetone and heated for about 4 hours at about 80° C. with about 50 cc. methyl chloride in a pressure chamber. About 320 ml. water are added to the reaction solution, and the acetone is distilled off. A 46%, thinly liquid latex is obtained which remains unchanged after storage for two months.

Soft foils of low elasticity, which can be vulcanized with formaldehyde or isocyanate, are obtained on glass plates.

Example 4

About 888 g. of a 24% solution of the polyurethane prepared in Example 3 are treated with about 19 cc. 1-N-hydrochloric acid until a pH of about 5 is reached. After the addition of about 320 cc. of water, the acetone is removed in vacuo. A milky white, water thin latex having a solids content of about 32% is obtained.

Example 5

About 1 kg. polypropylene glycol (OH number about 56 are dried for about 30 minutes to about 130° C. in vacuo. About 152 g. 2,4-toluylene diisocyanate are added, whereupon the temperature is maintained at about 130° C. for about 1 hour and then cooled to about 40° C. At this temperature, about 40 g. N-methyl-diethanolamine are stirred in, and the homogeneously stirred mass which rapidly becomes viscous is heated for another about 20 hours at about 80° C. A clear, soft rubbery mass is obtained which is dissolved in acetone to form a 33% solution.

About 225 g. of this solution are treated with about 9 ml. 1-N-hydrochloric acid (corresponding to about 50% of the quantity required for neutralization), and about 200 ml. water are then stirred in and the acetone is removed in vacuo. A 27% stable latex is obtained.

Example 6

The process is carried out as in Example 5 except that about 5 ml. 2-N-nitric acid are used instead of hydrochloric acid. The latex obtained is similar in its properties to that obtained in Example 5.

Example 7

The process is carried out as in Example 5 except that about 1.2 ml. acetic acid is used instead of hydrochloric acid. The latex obtained gives up the acetic acid again on drying, so that a hydrophobic, sticky polyurethane mass remains behind. This can be vulcanized, e.g. with polyisocyanates.

Example 8

The process is carried out as in Example 5 except that a solution of about 2.4 g. succinic acid in about 40 ml. water is used instead of hydrochloric acid. The polyurethane latex obtained is adjusted to pH 4–5 with tartaric acid and treated with about 3% dimethylol urea (calculated on pure polyurethane). The stable latex produces films which at about 100° C. undergo cross-linking and becomes elastic and insoluble. They can easily be dyed with basic dyestuffs.

Example 9

About 800 g. polypropylene glycol (OH number about 53) are dried at about 130° C. and reacted with about 382 g. 4,4-diphenylmethanediisocyanate for about 30 minutes at about 130° C. After cooling to about 40° C., about 120 g. N-methyldiethanolamine together with about 200 g. polyproylene glycol are rapidly stirred in, and the viscous melt is heated for another about 24 hours at about 100° C. An opaque, solid, rubbery polyurethane mass is obtained whi ch has a Defo hardness of about 2900 and a Defo elasticity of about 27 at about 20° C. The rubber dissolves in acetone to form a viscous, opaque solution.

About 300 g. of a 33% solution in acetone are quaternated with about 0.79 cc. dimethylsulphate for about 30 minutes at about 50° C. About 300 cc. water and about 10 ml. of a 10% solution of casein acetate are then added and the acetone is then removed in vacuo. A stable, thinly liquid latex is obtained which on drying produces elastic films which have a water swelling of about 5% after about 3 hours, about 14% after one day, and about 35% after about 7 days. The tensile strength is about 40 kp/cm.$^2$ The films can easily be dyed with acid dyestuffs.

The polyurethane mass contains about 0.93% amine nitrogen, but only about 0.11% of this is quaternated and thus present in the form of salt.

Example 10

About 250 g. of an adipic acid-hexanediol-neopentyl glycol-polyester are dried in vacuo at about 120° C. and reacted for about 2 hours with about 38.6 g. 1.6-hexane diisocyanate. About 150 ml. acetone (water content about 0.17%) are added to the viscous melt at about 80° C. and when the solution has been effected about 2.23 g. N,N-dimethylaminoethanol in about 50 ml. acetone are added. After about four hours stirring at about 55° C. the mixture is diluted with about 300 ml. acetone and quaternated with about 2.15 ml. dimethylsudphate (half an hour at about 50° C.). About 250 cc. water are then stirred in and approximately half the acetone contained therein is distilled off. About 2 g. casein lactate in about 10% aqueous solution are added as protective colloid to the thinly liquid, milky white latex, and the remaining acetone is removed by further distillation. A 58% polyurethane latex is obtained.

Example 11

The process is carried out as in Example 10 except that a solution of about 3.75 g. tartaric acid in about 110 ml. acetone are added instead of the amine, and diluted with about 600 ml. acetone after about 3 hours.

About 400 g. of the 27% solution obtained are adjusted to pH 7 with dilute ammonia solution, about 22 cc. water are added dropwise and the acetone is distilled off. A 42% latex is obtained which after the addition of some casein that has been opened up by ammonia may be further concentrated. On drying, a sticky, rubbery mass remains behind which can be vulcanized with polyisocyanates or with substances giving off formaldehyde.

Example 12

About 250 g. of an adipic acid-hexanediol-neopentyl glycol polyester are dried in vacuo at about 120° C. and reacted for about 2 hours with about 38.6 g. 1,6-hexane diisocyanate. About 150 ml. acetone are added to the viscous melt at about 80° C. and after solution is effected, the solution of about 3.75 g. tartaric acid in about 80 cc. acetone and of about 2.52 g. triethylamine in about 30 ml. acetone (corresponding to a neutralization equivalent) are added in succesion. After about 1 hour stirring at about 50° C. the solution is highly viscous and is diluted with about 750 ml. acetone.

About 400 g. of the opaque solution of the polyurethane salt are diluted with about 100 cc. acetone, and about 200 cc. water are slowly added dropwise with vigorous stirring. During the addition of water, the solution at first becomes highly viscous and somewhat non-homogeneous, and a thinly liquid, milky emulsion is then formed. When the acetone has been distilled off, a 36% thin latex remains behind which can be further concentrated by distilling off water. The latex shows a small sedimentation not earlier than after two months. It can, however, easily be redispersed by simply stirring. Without additional vulcanizing agents, the latex leaves behind on glass plates soft but tough, elastic and non-adhesive films which are stable to light.

Example 13

The process is carried out as in Example 12 except that about 37.5 g. 1,6-hexane diisocyanate and about 4.5 g. triethylamine (corresponding almost to two neutralization equivalents) are used. At the end, the reaction mixture is diluted with about 800 ml. acetone.

About 400 g. of the opaque acetone solution of the polyurethane salt obtained are diluted with about 100 cc. acetone, and about 200 cc. water are added dropwise with vigorous stirring. The solution at first becomes clear and then turbid and non-homogeneous, and on further addition of water it rapidly becomes thin and milky. After distilling off the acetone, a 44% stable latex is obtained which produces elastic, non-sticky clear films.

Example 14

In the procedure of Example 12 37.5 g. of 1,6-hexamethylene diisocyanate are employed. The tartaric acid solution additionally contains 2.8 g. of butane diol-1,4. After two hours stirring at 55° C. 300 ml. of acetone are added. 250 g. of the polyurethane solution are diluted with 250 ml. of acetone and a solution of 2.8 g. of diethanol amine in 300 ml. of water is added. When the acetone has been distilled off, a milky-white latex is obtained, which does not alter within a storage time of eight months.

Example 15

250 g. of polypropylene ether glycol (molecular weight 2000) are stirred for two hours at 80° C. with 114 g. of toluylene diisocyanate (2,4- and 2,6-isomers like 65:35). Then a solution of 61 g. of thiodiglycol and 0.05 g. of dibutyltindilaurate in 150 ml. of acetone (OH content 0.2 percent) are added. After stirring for 1.5 hours at 55° C. 200 ml. of acetone are added and further 456 cc. of acetone after further two hours.

300 g. of the viscous polyurethane solution have added thereto 2.85 ml. of dimethyl sulfate. The mixture is heated for four hours to 60° C., then diluted with 300 ml. of water. When the acetone has been distilled off, a 30 percent thin latex remains which has a pH value of 1,2 and nevertheless is stable for several weeks.

Example 16

250 g. of the polyester of Example 12 are dried in vacuo at 120° C. and reacted for 1.5 hours with 35 g. of 1,6-hexane diisocyanate. 27 g. of a 30 percent aqueous solution of the sodium salt of N-methyl-taurine are added at 70° C. and then 370 ml. of acetone in portions of 50:70 ml. each are added. The solution is diluted with 400 ml. of water slowiy within 30 minutes while the solution is firstly highly viscous and then thinly liquid and milky. When the acetone has been distilled off, a rather coarsely disperse, but stable 42 percent latex remains behind which dries to elastic non-sticky and light stable films.

Example 17

The procedure starts as in Example 16. Instead of the sodium salt of N-methyl-taurine 6.25 g. of β-bromo ethanol and 0.02 ml. of dibutyltindilaurate are employed. The mixture is heated for one hour to 90° C. Then at 60° C. a solution of 1 ml. of diethylene triamine in 170 ml. of acetone is added, the solution becoming viscous thereafter and is diluted with 200 ml. of acetone.

The solution is heated with 4 g. of pyridine for four hours to 100° C. and has added thereto 400 ml. of water. When the acetone has been distilled off, a 45 percent stable latex remains behind.

It is to be understood that the foregoing working examples are given for the purpose of illustration and that any other suitable polyisocyanate, active hydrogen containing compound, salt-forming component, solvent or the like could have been used in the examples provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. In the preparation of a polyurethane latex by a process which comprises dispersing a polyurethane in an aqueous medium, the improvement which comprises incorporating from 0.02 to about 1% by weight of a salt type group comprising a member selected from the class consisting of

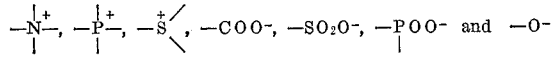

into said polyurethane with the proviso that said polyurethane contains less than about 0.2% by weight of quaternary nitrogen atoms and dispersing the resulting polyurethane in water.

2. The product of the process of claim 1.

3. A polyurethane latex prepared by a process which comprises reacting a polyhydroxyl compound with an organic polyisocyanate in the presence of at least one polyurethane forming component which contains from about 0.02 to about 0.2% quaternized nitrogen atoms and dispersing the resulting product in water to form a polyurethane latex.

4. A process for the preparation of a polyurethane latex which comprises reacting in a first step an organic diisocyanate with an organic dihydroxy compound having a molecular weight of from about 300 to about 10,000, at least one member selected from the group consisting of said organic diisocyanate and said dihydroxy compound containing a basic tertiary amino group in an amount of from about 0.02 to about 0.2% by weight of the weight of the polyurethane latex, quaternizing said basic amino group with an aqueous acid and dispersing the resulting polyurethane containing quaternizing ammonium ions in water in the absence of an emulsifying agent.

5. A process for the preparation of a polyurethane latex which comprises reacting in a first step an organic compound containing two active hydrogen containing groups as determined by the Zerewitinoff method and having a molecular weight of from about 300 to about 10,000 with an excess of an organic diisocyanate to prepare an essentially linear polyurethane having two free isocyanato groups, reacting said isocyanato urethane in a second step with a chain extending agent which contains a salt type group in an amount sufficient to include from about 0.02 to about 1% by weight of said salt type group selected from the class consisting of

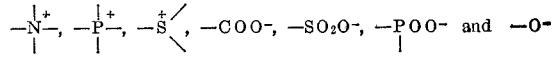

into said polyurethane with the proviso that said polyurethane contains less than about 0.2% by weight of quaternary nitrogen atoms and dispersing the resulting polyurethane in water.

6. The process of claim 5 wherein said chain extending agent is a low molecular weight glycol which contains a basic tertiary amino group which is reacted subsequent to chain extension of the isocyanato polyurethane with an inorganic acid.

7. A process for the preparation of a polyurethane latex which comprises reacting a dihydroxyl polyester having a molecular weight of from about 500 to about 4000 with an organic diisocyanate at a —NCO to —OH ratio of from about 0.9:1 to about 1.2:1 to form a preadduct in an inert organic solvent, reacting said preadduct with a dihydric alcohol containing a basic nitrogen atom to prepare a polyurethane adduct containing from about 0.02 to about 0.2% by weight of tertiary nitrogen atoms, reacting the resulting product with dimethyl sulphate in an amount sufficient to form a salt with substantially all of the basic nitrogen atoms and dispersing the resulting product in water to form a polyurethane latex.

References Cited

UNITED STATES PATENTS

| | | | |
|---|---|---|---|
| 2,968,575 | 1/1961 | Mallonee | 260—29.2 |
| 3,036,998 | 4/1962 | Rudner | |

FOREIGN PATENTS

| | | |
|---|---|---|
| 853,385 | 11/1960 | Great Britain. |
| 880,485 | 6/1953 | Germany. |
| 1,231,050 | 4/1960 | France. |

MURRAY TILLMAN, Primary Examiner

J. C. BLEUTGE, Assistant Examiner

U.S. Cl. X.R.

117—124, 126, 132, 139.4, 142, 148, 155, 161; 260—2, 5, 9, 18, 22, 29.4, 29.6, 29.7, 31.8, 37, 40, 75, 77.5, 849, 850, 859